United States Patent
Hebbalu et al.

(10) Patent No.: US 11,966,787 B2
(45) Date of Patent: Apr. 23, 2024

(54) DYNAMIC PROCESS CRITICALITY SCORING

(71) Applicant: McAfee, LLC, San Jose, CA (US)

(72) Inventors: Raghavendra Satyanarayana Hebbalu, Karnataka (IN); Dattatraya Kulkarni, Bangalore (IN); Srikanth Nalluri, Karnataka (IN); Partha Sarathi Barik, Bangalore (IN); Raja Sinha, Bangalore (IN); Anjan Kumar Nayak, Bangalore (IN)

(73) Assignee: McAfee LLC, San Jose, CA (US)

( * ) Notice: Subject to any disclaimer, the term of this patent is extended or adjusted under 35 U.S.C. 154(b) by 234 days.

(21) Appl. No.: 17/219,620

(22) Filed: Mar. 31, 2021

(65) Prior Publication Data

US 2022/0318061 A1   Oct. 6, 2022

(51) Int. Cl.
*G06F 9/46* (2006.01)
*G06F 9/50* (2006.01)

(52) U.S. Cl.
CPC .................................. *G06F 9/505* (2013.01)

(58) Field of Classification Search
CPC ..................................................... G06F 9/505
See application file for complete search history.

(56) References Cited

U.S. PATENT DOCUMENTS

2009/0113444 A1\*  4/2009  Hackborn ............. G06F 3/0481
                                                            719/312

FOREIGN PATENT DOCUMENTS

| CN | 111798113 A | \* | 10/2020 | ....... G06Q 10/06315 |
| DE | 112018005268 T5 | \* | 7/2020 | ............... G06F 9/50 |
| JP | 2018190355 A | \* | 11/2018 | ............... G06F 9/50 |
| WO | WO-2019117593 A1 | \* | 6/2019 | ........... G06F 9/5072 |

\* cited by examiner

*Primary Examiner* — Diem K Cao
(74) *Attorney, Agent, or Firm* — Patent Capital Group

(57) ABSTRACT

There is disclosed in one example a computer apparatus, including: a hardware platform including a central processor unit (CPU) and a memory; and instructions encoded within the memory to instruct the CPU to: enumerate a plurality of running processes, and associate resource demands with the running processes; predict a resource starvation condition for at least one process; rank the plurality of running processes according to a dynamic ranking algorithm, wherein the ranking algorithm includes user engagement as an input for ranking a process; and according to the ranking and a safeguard algorithm, deallocate resources from a process ranked lower than the at least one process and assign the deallocated resources to the at least one process to mitigate the predicted resource starvation condition.

20 Claims, 10 Drawing Sheets

| time | PROCESS CPU UTILIZATION PER SECON | CPU AVAILABILITY PER SECOND |
|---|---|---|
| 10 | 38 | 21 |
| 9 | 40 | 38 |
| 8 | 78 | 12 |
| 7 | 85 | 10 |
| 6 | 25 | 43 |
| 5 | 35 | 22 |
| 4 | 32 | 12 |
| 3 | 35 | 9 |
| 2 | 28 | 30 |
| 1 | 30 | 20 |

*Fig. 6*

DYNAMIC PROCESS CRITICALITY SCORING

FIELD OF THE SPECIFICATION

This application relates in general to multi-tasking computing systems, and more particularly, though not exclusively, to a system and method of providing dynamic process criticality scoring.

BACKGROUND

A multi-tasking computing system can run many processes concurrently.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIG. 6 illustrates a possibility of central processor unit (CPU) insufficiency.

SUMMARY

Figure 1:
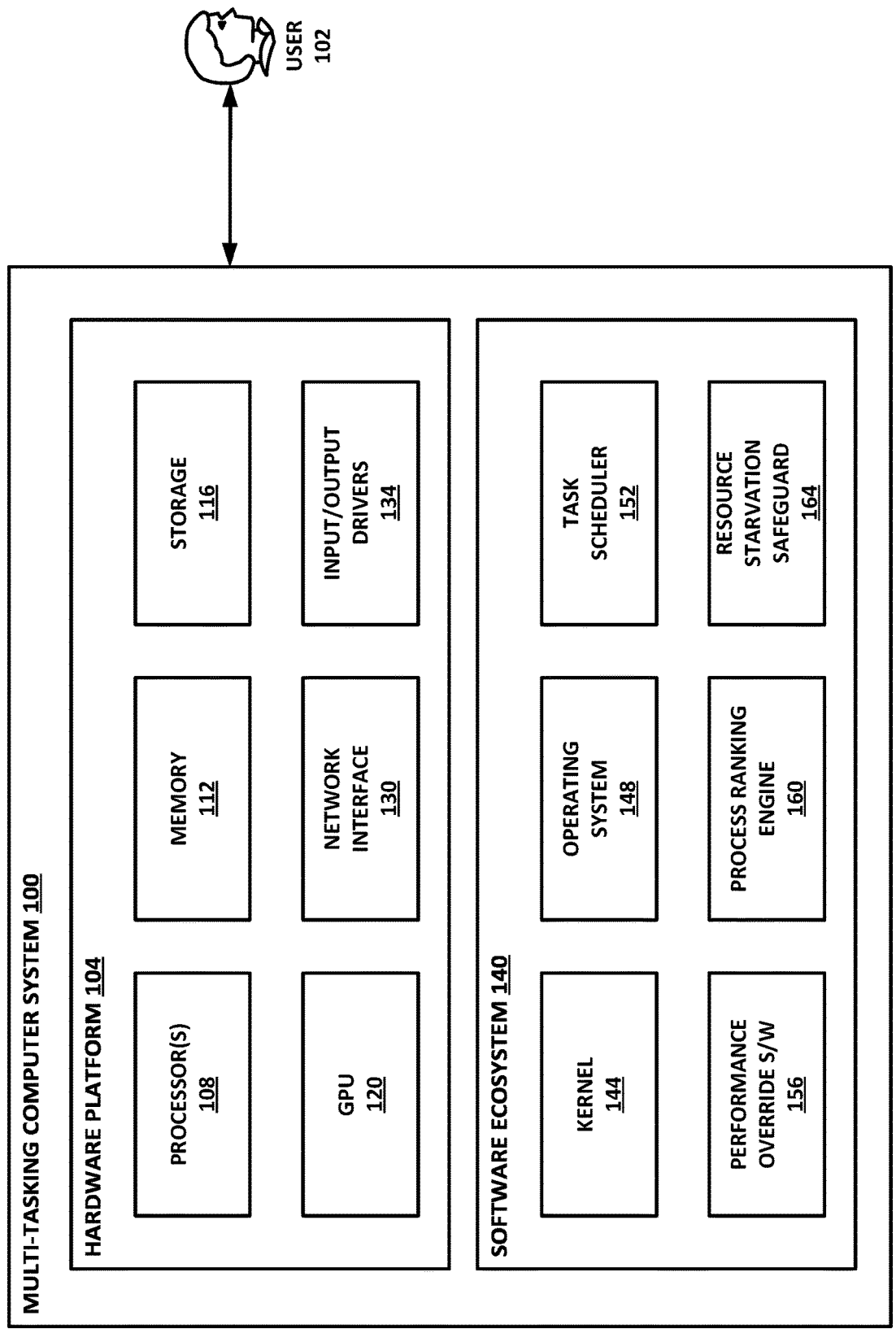
FIG. 1 is a block diagram illustration of a multi-tasking computer system.

In an example, there is disclosed a computer apparatus, including: a hardware platform including a central processor unit (CPU) and a memory; and instructions encoded within the memory to instruct the CPU to: enumerate a plurality of running processes, and associate resource demands with the running processes; predict a resource starvation condition for at least one process; rank the plurality of running processes according to a dynamic ranking algorithm, wherein the ranking algorithm includes user engagement as an input for ranking a process; and according to the ranking and a safeguard algorithm, deallocate resources from a process ranked lower than the at least one process and assign the deallocated resources to the at least one process to mitigate the predicted resource starvation condition.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Modern multi-tasking computing systems have ever-increasing capabilities. The famous "Moore's law" (which is more properly deemed an observation) is that semiconductor density in computing systems doubles approximately every 18 months to two years. However, a corollary to Moore's law is that as quickly as hardware engineers find new ways to increase the performance of computers, software engineers find new ways to strain those resources. Thus, even with ever-increasing performance capabilities, performance remains a concern, particularly in multi-tasking computer systems.

For example, high-end users may run resource intensive applications such as gaming, graphical rendering, video processing, ray tracing, artificial intelligence (AI), or other resource intensive applications. So-called "power users" may habitually override operating system default resource allocation mechanisms by setting higher priorities for their favorite applications and processes. There are also a number of commercial utilities, such as Razer Cortex, that automate this process. As a result, system resources such as the central processor unit (CPU), graphics processing unit (GPU), input/output (I/O), network, memory, or other resources may be allocated in a manner that overrides the default operating system mechanism. This can break the fairness inherent in multi-tasking systems. For example, if a user directs a large portion of critical system resources to a preferred process without being conscious of the requirements of other processes, this can have a severe impact on overall usability, system stability, and security. In some cases, users can become victims of the principle that "a little knowledge can be a dangerous thing." A user who knows enough to override default system settings to allocate additional resources to a preferred application such as a game, graphics program, AI engine, or other, but does not know enough to adequately provide for ensuring that other system critical processes have sufficient resources, may in fact degrade his or her own user experience with the preferred application.

In some existing systems, the operating system deliberately does not supervise resource prioritization performed in user mode, such as by an expert or power user, or by third-party utilities. This enables the user or an authorized utility to have full control over system resource allocation, which may be desirable for power users who want to ensure that certain preferred applications have the maximum available resources. However, this can lead to serious issues concerning system stability and security.

For example, on the Windows 10 operating system, a gamer with administrative access to the system may freely assign high CPU priority to a game, and may have the luxury of enhancing the game experience through this resource assignment. But at a certain upper limit, it is possible for a user to over-assign resources to the game, and to thereby disrupt other user features of the system. For example, a user or a third-party tool might prioritize a game to the point that security software does not get the necessary processor cycles to scan a newly created file.

If all of the CPU cores have been allocated to the game, and the operating system does not have the ability to override this, then the security software may be rendered inoperative, and the user's system may be compromised. In another example, the game may be granted priority to use the bulk of system resources, but the user could be, in the meantime, also watching a streaming media service, such as a video, or even a tutorial for the game that the user is playing. If the user has over-allocated resources to the game, then the user's experience in watching the video could be disrupted, even though contextually it would be clear to a human user that while watching the video and playing the game, the user would like to see some of the resources traditionally allocated to the game engine diverted to the video rendering engine, so that the user can both watch the video and play the game.

If insufficient resources are allocated to the streaming service, then the service's audio or video may experience glitches, lag, or other undesirable behavior. In an extreme case, if the user over-prioritizes a certain process and the operating system is unable to override this priority, the system could hang altogether as system critical processes are starved of resources and unable to perform their necessary functions.

Traditionally, the scheduling mechanism of an operating system is agnostic to the nature and context of a process. Rather, this operating system may simply know that a certain process has been assigned a particular priority, and may act on that priority. This contextual agnosticism may be by design, as the operating system may be designed to be neutral to all processes, so that competition for resources is handled fairly. Generally, when the user does not interfere in this resource handling, the result is a relatively balanced "middle-of-the-road" resource allocation, wherein all running processes are given a "fair" access to available resources, and processes are not allowed to block other processes. However, the operating system designer may recognize that a user may wish to prioritize certain resources, and thereby provide the override mechanisms discussed above. These mechanisms can be used to boost a process priority, and if used carefully and knowledgeably, can result in increased priority for desired processes or preferred applications. However, if these priorities are used with little knowledge, or inexpertly, then other system resources can be blocked. In that case, a resource crisis or resource starvation condition may occur.

Advantageously, a system and method of the present specification mitigates resource starvation by assigning contextual priority or dynamic criticality scores to processes. This system considers not only the user's static, pre-assigned process criticality, but also considers the real-time, current, and/or historical contextual usage of the process. For example, if a user assigns high priority to a game, then the operating system may allocate many or most system resources to that game.

However, if a contextual scoring engine observes that the user is also contextually interacting with or giving focus to a video or audio streaming application, then a dynamic criticality score can be assigned to that application, and the system can ensure that the audio or video streaming process has sufficient resources to perform its function. If that process later loses focus, stops streaming, or otherwise becomes contextually less relevant to the user's experience, then those resources can then be diverted back to the preferred gaming application.

A contextual process scoring engine of the present specification helps to provide consistent multi-tasking even when resources are assigned with higher priority, either manually or via a third-party tool. An embodiment of the present specification uses three categories of inputs to predict resource criticality and resource starvation. These include a dynamic criticality ranking of processes in the system, an inference of possible occurrences of system instability or resource starvation for a highly ranked process, and a safeguard engine. The safeguard engine may use a topologically-ordered process graph and remediation mechanism that assigns ranked processes a priority to ensure that they have adequate resources.

The criticality ranking may be contextual for specific time intervals of interest, such as a time window. An illustrative time window may be, for example, 10 seconds, although a time window could also be of a different period, such as between 1 and 10 seconds, 10 and 30 seconds, 30 and 60 seconds, or between 0 and 60 seconds, by way of illustrative and nonlimiting example.

Across a time window, processes may be ranked based on factors such as a usage affinity for a prioritized process, the process criticality to system usage profile, and the naked criticality of a process such as a system process, Windows session-0 services, and antivirus, security, or other services. In the foregoing, the dynamic process criticality according to a system usage profile may be selected from a plurality of profiles, such as business or office work, leisure, gaming, kids, or other profiles. This criticality ranking can be used to identify a so-called "ranked process," or in other words, a process with a high criticality rating.

A resource starvation predictor may infer possible occurrences of system instability by monitoring resource needs in ranked processes. For example, the starvation predictor can determine if a ranked process is in danger of resource starvation, for example because excessive resources have been allocated to a process with a manually assigned high priority. Prolonged usage of critical resources by a set of processes with high priority can cause a range of uncertainties, including slowness in other applications, lag in the user interface (UI), lost UI events, or more severe issues such as complete system hang or starvation of an antivirus or security process, which could leave a serious security aperture in the system. To predict instability, the system may confirm that a process needs more resources than it is getting. When the system determines, such as within a window, that a ranked process is in danger of resource starvation, it can take appropriate remedial action.

Remedial action may be taken by activation of a safeguard engine to remediate problems. The safeguard engine may provide a two-step operation. First, the system may identify processes that should surrender additional resources. Second, the system may employ a strategy to claim the resources. The intensity of safeguards depends on the severity of the resource crisis in ranked processes. In an embodiment, the safeguard engine attempts to provide just enough resources to ensure that critical processes are not starved of resources, and can continue to function. This can ensure that ranked processes receive sufficient resources, while also diverting (e.g., from manually-ranked processes) only so many resources as are necessary to avoid resource starvation.

Note that certain embodiments of the present specification do not attempt to modify operating system default scheduling and priority management. Rather, the system guards against undesirable impacts if monopolization of resources is a danger due to manually-signed resource rankings.

To this end, the system of the present specification provides a resource ranking engine that employs a dynamic ranking algorithm. This algorithm computes a process engagement score. The process engagement score may be used to rank processes and identify so-called "ranked processes" (or, in other words, highly-ranked or critical processes). The system then provides a resource insufficiency predictor, including a formula or algorithm for computing resource insufficiency. The system may then provide resource-wise process prioritization topology data structures. A safeguard activation algorithm selects processes for deprioritization, based on resource type and highest possible demand. In some embodiments, the intelligence and intensity of a safeguard may minimize the cost of safeguard activation.

Advantageously, the system of the present specification prevents performance degradation in an overall system when resources are allocated to a set of processes. This system does not discourage or prevent manual prioritization by the user, or by third-party applications, but rather makes prioritization intelligent and judicious. The user can still assign high priority to certain resource-intensive processes, but that priority assignment is mitigated to the extent necessary to ensure that other processes are not starved of necessary resources. To this end, the system may identify a user-specific relative importance of a process. This can help to keep resource prioritization intelligent, and may track local or most recent usage patterns. The system also infers the likelihood of resource crisis for critical processes, to ensure that starvation does not occur.

The foregoing can be used to build or embody several example implementations, according to the teachings of the present specification. Some example implementations are included here as nonlimiting illustrations of these teachings.

There is disclosed in one example a computer apparatus, comprising: a hardware platform comprising a central processor unit (CPU) and a memory; and instructions encoded within the memory to instruct the CPU to: enumerate a plurality of running processes, and associate resource demands with the running processes; predict a resource starvation condition for at least one process; rank the plurality of running processes according to a dynamic ranking algorithm, wherein the ranking algorithm includes user engagement as an input for ranking a process; and according to the ranking and a safeguard algorithm, deallocate resources from a process ranked lower than the at least one process and assign the deallocated resources to the at least one process to mitigate the predicted resource starvation condition.

There is further disclosed an example computing apparatus, wherein the instructions are further to build a topologically-ordered process graph to use as an input to the ranking algorithm.

There is further disclosed an example computing apparatus, wherein the topologically-ordered process graph comprises a two-dimensional matrix of process priority and resource priority.

There is further disclosed an example computing apparatus, wherein user engagement is a function of user focus time.

There is further disclosed an example computing apparatus, wherein user engagement is a function of user interactions with a user interface.

There is further disclosed an example computing apparatus, wherein user engagement is a function of data streaming duration.

There is further disclosed an example computing apparatus, wherein user engagement is a function of a usage mode.

There is further disclosed an example computing apparatus, wherein the usage mode is selected from work, leisure, or kids.

There is further disclosed an example computing apparatus, wherein the ranking algorithm includes a static user-assigned ranking as an input.

There is further disclosed an example computing apparatus, wherein the ranking algorithm includes system criticality as an input.

There is further disclosed an example computing apparatus, wherein predicting the resource starvation condition comprises examining a process's resource utilization over a window, and resource availability over a window, and predicting a starvation condition if a difference between a maximum usage and a minimum availability within the window is less than a threshold.

There is further disclosed an example computing apparatus, wherein the plurality of running processes have a pre-assigned rank selected from 0, 1, and 2.

There is further disclosed an example computing apparatus, wherein the safeguard algorithm uses a minimum of 20% availability for a resource for a process with a pre-assigned rank of 0.

There is further disclosed an example computing apparatus, wherein the safeguard algorithm uses a minimum of 15% availability for a resource for a process with a pre-assigned rank of 1.

There is further disclosed an example computing apparatus, wherein the safeguard algorithm uses a minimum of 5% availability for a resource for a process with a pre-assigned rank of 2.

There is further disclosed an example computing apparatus, wherein the dynamic ranking algorithm accounts for only n top-ranked processes.

There is further disclosed an example computing apparatus, wherein $2 \leq n \leq 10$.

There is further disclosed an example computing apparatus, wherein at least some of the plurality of processes have a pre-assigned priority.

There is further disclosed an example computing apparatus, wherein deallocating comprises deallocating resources from a process with a higher pre-assigned priority to a process with a lower pre-assigned priority or without a pre-assigned priority.

There is also disclosed an example of at least one tangible, non-transitory computer-readable storage medium having stored thereon executable instructions to: enumerate a plurality of running processes having user-assigned static rankings; identify a resource starvation condition for a selected process; dynamically rank the plurality of running processes via a dynamic ranking algorithm that includes a user engagement score; and apply a safeguard algorithm to shift resources to the selected process from a process ranked lower by the dynamic ranking algorithm.

There is further disclosed an example of at least one tangible, non-transitory computer-readable storage medium, wherein the instructions are further to build a topologically-ordered process graph to use as an input to the ranking algorithm.

There is further disclosed an example of at least one tangible, non-transitory computer-readable storage medium, wherein the topologically-ordered process graph comprises a two-dimensional matrix of process priority and resource priority.

There is further disclosed an example of at least one tangible, non-transitory computer-readable storage medium, wherein user engagement is a function of user focus time.

There is further disclosed an example of at least one tangible, non-transitory computer-readable storage medium, wherein user engagement is a function of user interactions with a user interface.

There is further disclosed an example of at least one tangible, non-transitory computer-readable storage medium, wherein user engagement is a function of data streaming duration.

There is further disclosed an example of at least one tangible, non-transitory computer-readable storage medium, wherein user engagement is a function of a usage mode.

There is further disclosed an example of at least one tangible, non-transitory computer-readable storage medium, wherein the usage mode is selected from work, leisure, or kids.

There is further disclosed an example of at least one tangible, non-transitory computer-readable storage medium, wherein the ranking algorithm includes a static user-assigned ranking as an input.

There is further disclosed an example of at least one tangible, non-transitory computer-readable storage medium, wherein the ranking algorithm includes system criticality as an input.

There is further disclosed an example of at least one tangible, non-transitory computer-readable storage medium, wherein predicting the resource starvation condition comprises examining a process's resource utilization over a window, and resource availability over a window, and predicting a starvation condition if a difference between a maximum usage and a minimum availability within the window is less than a threshold.

There is further disclosed an example of at least one tangible, non-transitory computer-readable storage medium, wherein the plurality of running processes have a pre-assigned rank selected from 0, 1, and 2.

There is further disclosed an example of at least one tangible, non-transitory computer-readable storage medium, wherein the safeguard algorithm uses a minimum of 20% availability for a resource for a process with a pre-assigned rank of 0.

There is further disclosed an example of at least one tangible, non-transitory computer-readable storage medium, wherein the safeguard algorithm uses a minimum of 15% availability for a resource for a process with a pre-assigned rank of 1.

There is further disclosed an example of at least one tangible, non-transitory computer-readable storage medium, wherein the safeguard algorithm uses a minimum of 5% availability for a resource for a process with a pre-assigned rank of 2.

There is further disclosed an example of at least one tangible, non-transitory computer-readable storage medium, wherein the dynamic ranking algorithm accounts for only n top-ranked processes.

There is further disclosed an example of at least one tangible, non-transitory computer-readable storage medium, wherein $2 \leq n \leq 10$.

There is further disclosed an example of at least one tangible, non-transitory computer-readable storage medium, wherein at least some of the plurality of running processes have a pre-assigned priority.

There is further disclosed an example of at least one tangible, non-transitory computer-readable storage medium, wherein shifting resources to the selected process comprises shifting resources from a process that has a higher pre-assigned priority than the selected process.

There is also disclosed a method of providing process management for a computing system, comprising: receiving static priority assignments for a plurality of processes; predicting that a selected process from among the plurality of processes will encounter a resource shortage; dynamically ranking the plurality of processes according to a dynamic ranking algorithm; selecting a lower-ranked process from the dynamic ranking; and shifting a resource allocation from the lower-ranked process to the selected process.

There is further disclosed an example method, wherein the dynamic ranking algorithm accounts for a user engagement factor.

There is further disclosed an example method, further comprising building a topologically-ordered process graph to use as an input to the dynamic ranking algorithm.

There is further disclosed an example method, wherein the topologically-ordered process graph comprises a two-dimensional matrix of process priority and resource priority.

There is further disclosed an example method, wherein the dynamic ranking algorithm includes user engagement, wherein user engagement is a function of user focus time.

There is further disclosed an example method, wherein the dynamic ranking algorithm includes user engagement, wherein user engagement is a function of user interactions with a user interface.

There is further disclosed an example method, wherein the dynamic ranking algorithm includes user engagement, wherein user engagement is a function of data streaming duration.

There is further disclosed an example method, wherein the dynamic ranking algorithm includes user engagement, wherein user engagement is a function of a usage mode.

There is further disclosed an example method, wherein the usage mode is selected from work, leisure, or kids.

There is further disclosed an example method, wherein the dynamic ranking algorithm includes a static user-assigned ranking as an input.

There is further disclosed an example method, wherein the dynamic ranking algorithm includes system criticality as an input.

There is further disclosed an example method, further comprising predicting a resource starvation condition, comprising examining a process's resource utilization over a window, and resource availability over a window, and predicting a starvation condition if a difference between a maximum usage and a minimum availability within the window is less than a threshold.

There is further disclosed an example method, wherein the plurality of processes have a pre-assigned rank selected from 0, 1, and 2.

There is further disclosed an example method, further comprising applying a safeguard algorithm that uses a minimum of 20% availability for a resource for a process with a pre-assigned rank of 0.

There is further disclosed an example method, further comprising applying a safeguard algorithm that uses a minimum of 15% availability for a resource for a process with a pre-assigned rank of 1.

There is further disclosed an example method, further comprising applying a safeguard algorithm that uses a minimum of 5% availability for a resource for a process with a pre-assigned rank of 2.

There is further disclosed an example method, wherein the dynamic ranking algorithm accounts for only n top-ranked processes.

There is further disclosed an example method, wherein $2 \leq n \leq 10$.

There is further disclosed an example method, wherein at least some of the plurality of processes have a pre-assigned priority.

There is further disclosed an example method, wherein the lower-ranked process has a higher pre-assigned priority than the selected process.

A system and method for providing dynamic process criticality scoring will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustration of a multi-tasking computer system 100, operated by a user 102.

Multi-tasking computer system 100 is based on a hardware platform 104. In this example, hardware platform 104 includes a processor 108, memory 112, storage 116, GPU 120, network interface 130, and I/O drivers 134.

Processor 108 may be a physical CPU, microcontroller, or other processor, including a processor that could provide virtualization. Hardware platform 104 may be an example of a hardware platform, as described in additional detail in FIG. 8 below.

Multi-tasking computer system 100 also includes a software ecosystem 140. Software ecosystem 140 includes a running kernel 144, an operating system 148, a task scheduler 152, performance override software 156, a process ranking engine 160, and a resource starvation safeguard 164.

Kernel 144 may provide the core of operating system 148, and provides various low-level routines, hardware drivers, a network stack, and other similar system services. Operating system 148 may include a number of utilities and services that run on top of kernel 144. In particular, operating system 148 may include a task scheduler 152, which may be a privileged task itself, and which may monitor other tasks and may have the general responsibility for ensuring that tasks receive adequate resources. Task scheduler 152 may provide any of a number of various task scheduling algorithms, such as, by way of illustrative and nonlimiting example: first come first serve (FCFS), priority scheduling, shortest remaining time first (SRTF), fixed priority preemptive scheduling, round-robin scheduling, multi-level queue scheduling, work conserving scheduling, or others.

If a user is not satisfied with the default scheduling provided by task scheduler 152, the user may use performance override software 156, for example, to increase the priority of certain tasks. For example, if user 102 is a gamer, user 102 may elect to use performance override software 156 to manually set a priority or interrupt level for a process, such as a game. Commonly, priority is provided as an integer, with a lower numerical integer representing higher priority. Thus, in a common embodiment, an integer value of 0, 1, or 2 may be assigned to a particular process. This pre-assigned priority indicates the subjective criticality of the process to the end user.

While this can result in increased performance for a desired process, it can also result in resource starvation for other critical resources in the system. Thus, a process ranking engine 160 may also be provided. Process ranking engine 160 may include hardware and/or software to contextually evaluate running processes, and to dynamically assign a criticality or other rank to running processes. This dynamic assignment may be contextual and may include, for example, a user engagement score. Using the contextual ranking, resource starvation safeguard 164 may then apply a safeguard algorithm to reallocate resources between processes.

Figure 2:
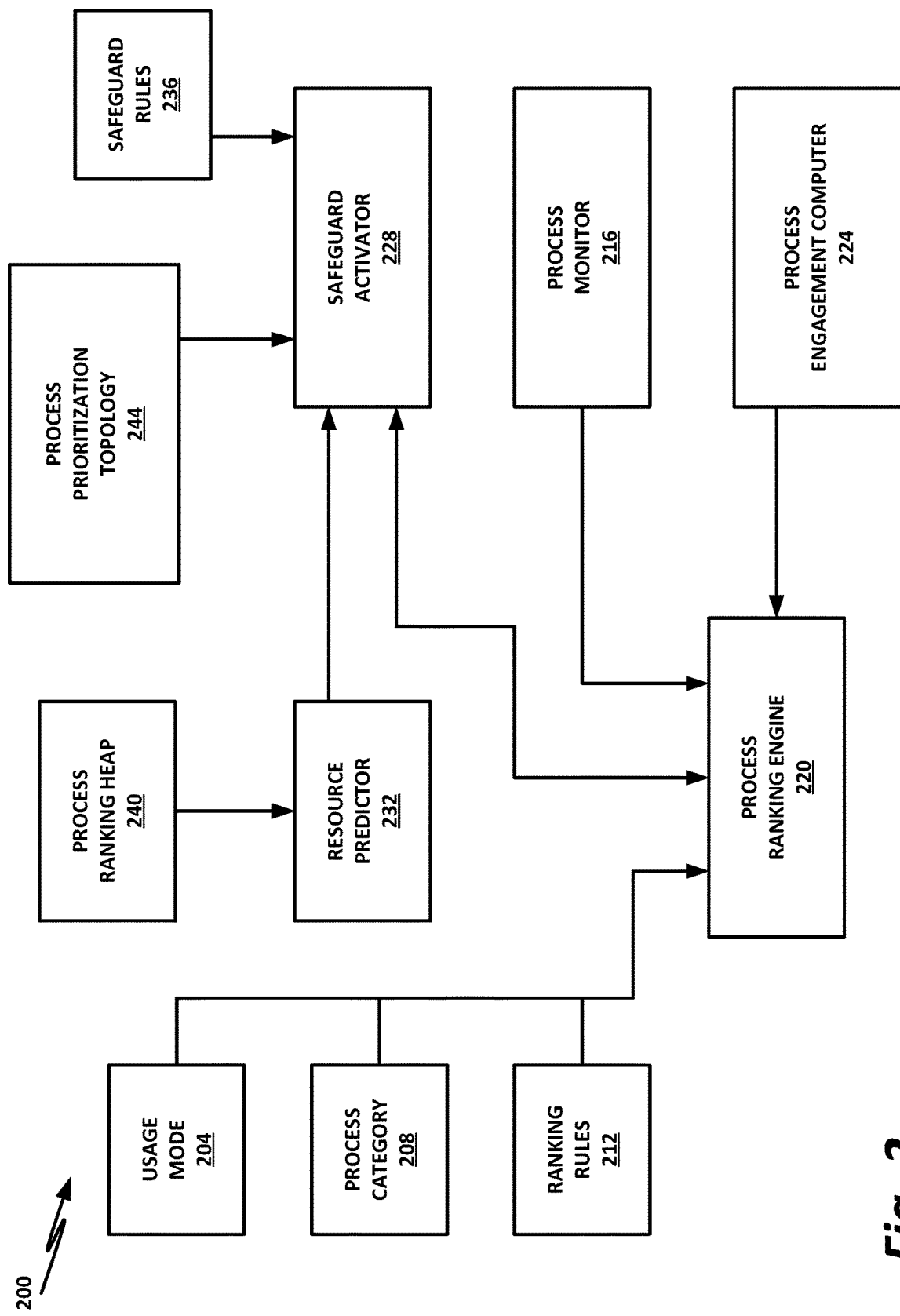
FIG. 2 is a block diagram illustration of selected elements of a process ranking ecosystem.

FIG. 2 is a block diagram illustration of selected elements of a process ranking ecosystem 200. Process ranking ecosystem 200 includes a process ranking engine 220, and a safeguard activator 228. Process ranking engine 220 provides a criticality ranking. Criticality may include two different species of processed criticality. First, some processes are always important to the system (i.e., throughout the operating system lifecycle). This would include, for example, a session-0 process. A second category includes processes that are contextually important, such as a set of processes that the processor is using for a particular task.

The criticality ranking of the present specification provides a dynamic contextual ranking to create and maintain a structure of important processes. Process ranking engine 220 provides a dynamic rank or criticality to a process. This is known as a criticality ranking, and in some embodiments, creates and maintains the structure of important processes. The structure may continuously update, based on changes in context or other aspects of the system. For example, in the system context, an audio/video (AV) scan or patch update may temporarily increase the criticality ranking of an anti-virus engine. Furthermore, user behavior such as watching a video, listening to audio, rendering an image to e-mail, or changing the usage mode could also affect criticality.

Process ranking engine 220 includes logic. Process ranking engine 220 infers the importance of a plurality of processes, and maintains an order based on the inferred importance. Process ranking engine 220 may receive, as inputs, a usage mode 204, a process category 208, and ranking rules 212. Usage mode 204 may be selected from a plurality of predefined modes, such as work, gaming, leisure, kids, or other modes. Process category 208 may be used to identify the type of process. For example, the process could be a system process, a user process, a security process, or belong to some other category.

Ranking rules 212 may be statically assigned ranking rules, and may include user input, including a user preference for priority. This could be based on a pre-set criticality or process ranking designated by the user to the operating system, or via third-party software. For example, if a user sets the "nice" value of a process to 0, then this indicates that the process has high priority. There are many other mechanisms by which a user can set process priority via the operating system, or via third-party software. In other cases, process ranking engine 220 may provide a UI, via which the user can set a preferred process priority. This preferred process priority may be understood to interact with the other aspects of process ranking engine 220.

A process monitor 216 observes new process creation in the system, and communicates the presence of a new process to process ranking engine 220, which may trigger the ranking algorithm.

The process ranking algorithm may leverage various criteria including, for example, a process engagement score, a process category, static ranking rules, and others. Static ranking rules capture either user preferences or processes that tend to have a lower engagement score and that belong to a noncritical process category, but that may still be contextually important.

The usage mode helps to determine the contextual importance of a process. For example, this may help to identify processes, such as video conferencing, that may be highly important when the user is working, but less important when the user is performing a leisure activity, such as watching a video streaming service. The usage mode may be selected, for example, from work, leisure, kids, or other modes.

A process engagement computer 224 uses a process engagement algorithm to establish the affinity of a process to the current usage mode, or the current usage conditions. Process engagement computer 224 derives affinity of a process to a usage mode based on the user's past engagement patterns, and current usage.

A resource predictor 232 uses a process ranking heap 240 to predict resource availability according to methods disclosed herein, and to specifically predict a resource starvation condition, wherein a process may not have sufficient resources to meet its resource demand.

A safeguard activator 228 receives rankings from process ranking engine 220, and also relies upon a process prioritization topology 244 and safeguard rules 236. With these, safeguard activator 228 may perform a safeguard remediation, such as by deallocating resources from one process, and reallocating those resources to another process. In one example, the process that has its resources deallocated may actually have a higher static ranking according to ranking rules 212, but because of this high static ranking, it has been assigned too many resources. This can cause it to starve other processes that are contextually important to a particular use case. Thus, safeguard activator 228 may deallocate resources from the higher ranked (according to static rules) process, and reallocate or shift those resources to a lower-ranked process (according to the static ranking rules).

Figure 3:
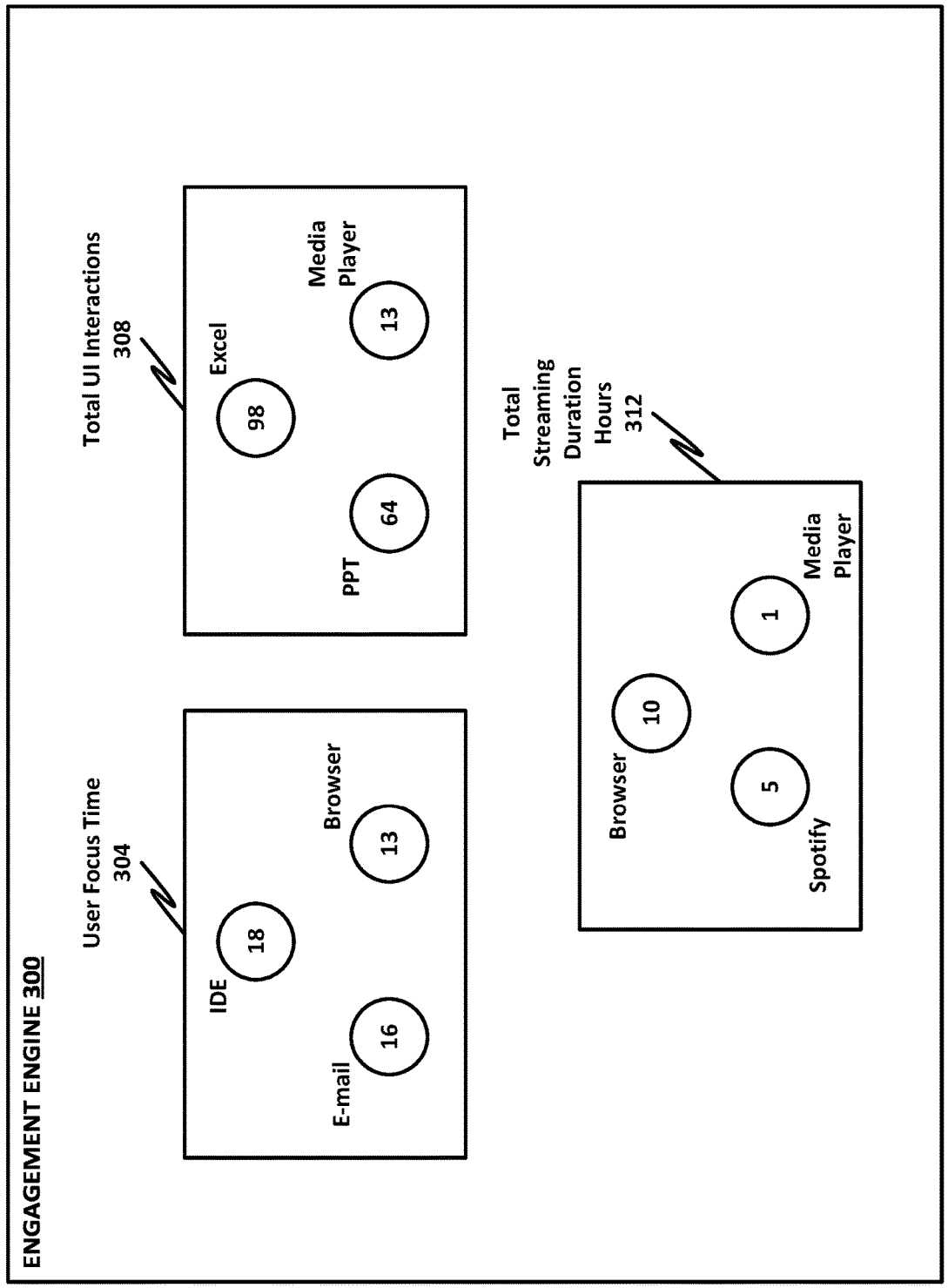
FIG. 3 is a block diagram of selected aspects of an engagement engine.

FIG. 3 is a block diagram of selected aspects of an engagement engine 300. Engagement engine 300 establishes an affinity of a process to a usage mode. This may be used by a process engagement computer to drive affinity of a process to the usage mode based on the user's past and/or current engagement patterns. In this example, three aspects of user engagement are illustrated, namely user focus time 304, total UI interactions 308, and total streaming duration hours 312. In this example, engagement engine 300 maintains three heap structures of process IDs with respect to each criterion illustrated in this FIGURE. Each heap may be ordered based on the maximum score of each criterion. The features disclosed herein may be assigned a numeric weight derived from the feature importance to compute a process ranking. The weights may be computed using, in one example, "Gini feature importance." This may be computed according to the following formula:

$$FI\_Feat = N\_Current / N\_Total$$
$$* (impurity - N\_Split1 / N\_Current * split1\_impurity - N\_Split2 / N\_Current * split2\_impurity)$$

FI_Feat = Feature Importance
N_Total = Total number of samples
N_Current = Number of samples at the current node
N_Split1 = Number of samples in the split1 child
N_Split2 = Number of samples in the split2 child
FI_Feat = Feature Importance of the feature
impurity = impurity in the parent node.
Feature: {"User Focus Time," "Number Of UI Interactions," "Total Streaming Duration"}
Assumption: $- 0 \leq FI\_Feat \leq 1$
Wt_Feat_INT = (FI_Feat * 100)
[(Wt_Feat_INT >= 0) $\wedge$ (Wt_Feat_INT $\leq$ 33) $\geq$ Wt_Feat = 10]
& [(Wt_Feat_INT $\geq$ 34) $\wedge$ (Wt_Feat_INT $\leq$ 66) $\geq$ Wt_Feat = 20]
& [(Wt_Feat_INT $\geq$ 67) $\wedge$ (Wt_Feat_INT $\leq$ 100) $\geq$ Wt_Feat = 30]
Wt_Feat___INT = Intermediate weight(scaled in the range of 0-100) of the feature.
$0 \leq Wt \leq 100$
Wt_Feat = Final weight assigned to the feature.
Freq_Feat = Frequency of observation per feature.
$PES = \Sigma_{i=0}^{2}(Wt_{Feat} * Percentile\_Freq\_Feat)$
PES = "Process Engagement Score" for each process.

Where, Percentile_Freq_Feat is the percentile frequency per feature per process. Processes with greater than 90% frequencies for at least one of the three features are selected for process engagement score computation, other processes are ignored.

Further PES is categorized into HIGH, MEDIUM AND LOW.
Process Rank Computation:
Process Category: {CRITICAL, IMPORTANT, UNIMPORTANT}
PES: {HIGH, MEDIUM, LOW}
Importance of a process in Static Ranking Rules: {CRITICAL, IMPORTANT, UNIMPORTANT}
Input:
PC: Process Category
PES: Process Engagement Score
SRR: Static Ranking Rules -continued

```
Output:
Process Ranking Heap
Procedure:
Step1: for iter=0 to N(Number of currently running processes in the system)
Step2: if (PC == CRITICAL)
Assign Rank '0' to the process
else if ((PC == IMPORTANT) && (PES == HIGH))
Assign Rank '1' to the process.
Else if ((PC == IMPORTANT) && (PES == MEDIUM))
Assign Rank '2' to the process
else if (Importance In SRR == CRITICAL)
Assign Rank '0' to the process
else if (Importance In SRR == IMPORTANT)
Assign Rank '1' to the process
Step3: adjust the heap
Step4: iter++
Step5: end for iter
```

In this example, user focus time 304 keeps track of the three highest ranked processes for user focus time. These include an e-mail program, a browser, and an integrated development environment (IDE). As can be seen here, the IDE is ranked highest, with a focus time of 18 hours. E-mail has had focus for 16 hours, and the browser has had focus for 13 hours. Other processes may have other user focus times, but are not used in this illustration, because the user engagement heap in this embodiment uses only the top three scored processes.

Total UI interactions includes the number of times the user has interacted with the UI. In this case, the spreadsheet program Excel has the most interactions, with 98. Power-Point, with 64 interactions, has the next most. A media player, with 13 interactions, has the next highest number.

In yet another factor, total streaming duration hours 312 may also be used. This tracks the number of hours that the processes have received streaming audio or video data. At the top is a browser, with 10 hours of user focus time. The next highest is Spotify, a music application, with 5 hours. The next highest is a media player, with 1 hour. Note that the media player of block 312 and the media player of block 308 may be the same media player. Thus, this media player is in the top three for both total UI interactions and total streaming duration hours.

Engagement engine 300 provides an input to a process ranking engine, such as process ranking engine 220 of FIG. 2. The process ranking engine may provide a process ranking algorithm. An example process ranking algorithm includes the following:

$$D_n = T_{avg} - (U^n - P_{avg}) \; \{Valid\; case : U^n > P_{avg}\}$$
$$((D^n \leq X) \rightarrow IP) \& (\sim(D^n \leq X) \rightarrow NIP)$$

Tavg = Average system CPU available.
$U^n$ = Usage at nth second.
Pavg = Avg CPU consumption of current process.
X = 5, minimum threshold for Dn, depicts a safe positive difference between average available resource and SD at nth second of observation.
IP = Insufficiency predicted
NIP = No insufficiency predicted A resource predictor such as resource predictor 232 may also be used in the system. The resource predictor infers the possibility of a resource insufficiency based on a pattern of total system resource usage, and the usage of a critical process under observation. Note that usage values do not necessarily imply demand, since the demand may be much higher than the usage, and the demand may not be served because of unavailability.

Embodiments of this specification use a two-step approach to determine the demand for additional resources. First, the system identifies a possible need for additional resources. A system resource availability with respect to the ranking of a process may be a trigger for evaluating demand for additional resources.

Figure 4:
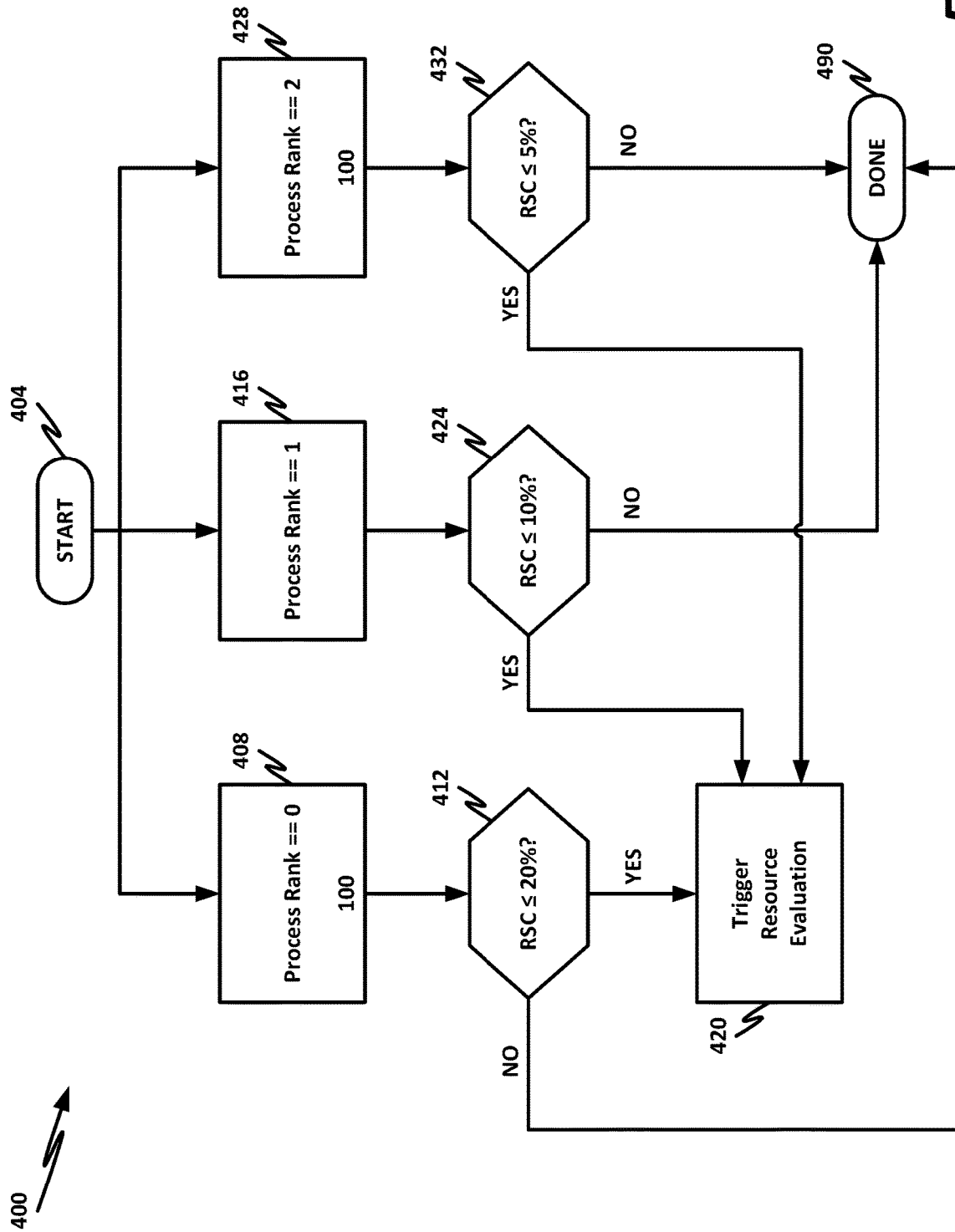
FIG. 4 is a flowchart illustrating a resource demand prediction.

FIG. 4 is a flowchart illustrating a resource demand prediction. In the example of method 400, processes may be assigned a static or dynamic rank value of 0, 1, or 2.

The method begins in block 404.

Block 408 handles the case where a process has rank 0, indicating it has the highest available priority. In the case of rank 0, in decision block 412, the system determines whether an available resource has less than or equal to 20% available. If the resource availability is not less than or equal to 20%, then in block 490, the method is done. However, if the resource is less than or equal to 20%, then in block 420, the resource evaluation may be triggered.

Block 416 handles the case of processes with rank 1, or an intermediate ranking. For processes of rank 1, in decision block 424, the system determines whether a needed resource has less than or equal to 10% availability. If not, then in block 490, the method is done. If the resource is less than or equal to 10% available, then in block 420, the resource evaluation is triggered.

Block 428 handles the case of a process with rank 2, or a lower-ranked process. In decision block 432, the system determines whether resources are less than or equal to 5% available. If not, then in block 490, the method is done. If resources are less than or equal to 5% available, then in block 420, resource evaluation is triggered.

The second step of the resource insufficiency prediction may evaluate demand on additional resources. In this approach, the resource consumer's priority (if high) may be brought down to the priority of the ranked process. In other words, if a process with priority 0 is consuming resources, it may be brought down to the ranking of 1 for comparison to other processes. Once this is done, the highest value of resources consumed may be recorded for the ranked process. In an embodiment, this variable is called MAX_RES (e.g., MAX_CPU, MAX_IO, MAX_NETWORK, etcetera). This value implies the highest possible demand of the resource observed within the time window. The system can then determine whether this demand can be consistently served, keeping the priority of the current process consumers unchanged (e.g., high or rank=0).

Figure 5:
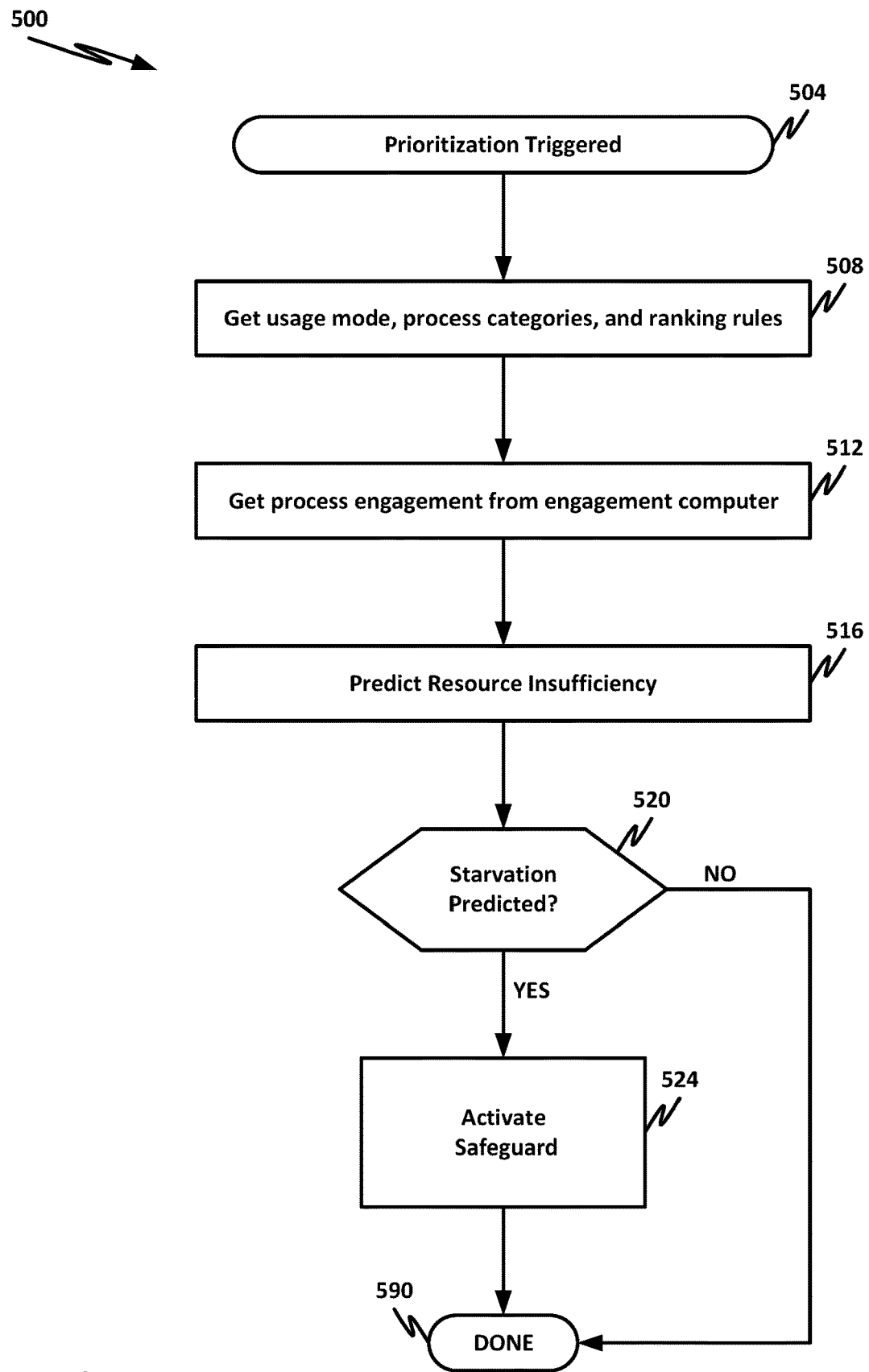
FIG. 5 is a flowchart of a method.

FIG. 5 is a flowchart of a method 500. Method 500 may be performed by a system, such as prioritization ecosystem 200 of FIG. 2.

In block 504, the system starts when prioritization is triggered. For example, prioritization could be triggered when a resource falls below the threshold for a particular process of a given rank, as illustrated in FIG. 4.

In block 508, the ranking engine gets the relevant input data, such as the usage mode, process categories, static ranking rules, and other information that may be used in the dynamic ranking algorithm.

In block 512, the prioritization engine may also receive from the engagement computer an appropriate engagement score. This engagement score may be based on historical trend data as illustrated, for example, in FIG. 3.

In block 516, the system may determine, according to a resource predictor, if a resource starvation condition is predicted for a particular process. For example, if system resources have been over-allocated to a process that the user subjectively deems to be of high importance (e.g., a game, video rendering process, or similar), then resource starvation may occur for other processes that have a lower static ranking.

If no starvation is predicted, then in block 590, the method is done.

However, returning to decision block 520, if a potential starvation condition is predicted, then in block 524, the system may activate an appropriate safeguard algorithm. The safeguard algorithm may take various remedial actions, such as deprioritizing a particular process. For example, if a user has assigned a static rank of 0 to a game process, but the game process is starving a security-critical antivirus agent, then the ranking of the game process could be lowered to match the ranking of the antivirus process. Thus, both may have a dynamic ranking value of 1, whereas the game process may have previously had a static ranking of 0. This enables the operating system to deallocate resources from the game process, and reallocate them to the antivirus process. Alternatively, the safeguard engine itself may deallocate resources from the game process and reallocate them to the antivirus process. Other remedial actions could also be taken.

In block 590, the method is done.

FIG. 6 illustrates a possibility of CPU insufficiency, when the demand is higher than average, and the available total CPU bandwidth is not high enough. In particular, it can be seen in graph 600 that within this window, the ranked process's CPU utilization was 85%. The availability per second is also tracked. In this case, no actual starvation has been observed. Throughout the 10-second window, CPU demand did not exceed availability. However, comparing utilization at the seventh second to availability at the third second, it can be seen that a potential resource starvation condition could be reached. If the 85% utilization had arisen at the 3-second mark, then the demand could not be served, and in fact, only 43% of the resource demand could have been served.

A formula to determine the ability of the system to serve the highest possible demand of the ranked process is:

---

Input:
RT: Resource Type
HPD: Highest possible demand
Output:
Set of processes for deprioritization
Procedure:
  Step1: for iter=1 to N(Number of processes in the adjacency list for the given resource type;
  iter pointing to the first element)
    Step2: select the process P at the front for the "resource type" from the adjacency list.
    Step3: if(Rank of P < 2)
      if(Historical feedback of deprioritizing P is −ve)//i.e., P is at the end in "Historical Feedback" list.
        {iter++}//Pick the next process from the resource list.
      Else
        if(P is at the end in the "Dependency Chain" list)//i.e., Critical processes are dependent on P.
          {iter++}
        else
          Select P // P is a candidate for deprioritization.
    Step4: else
      {iter++; }
    Step5: end for iter

---

This formula computes the difference between the average system resources available and additional demand of resources at the $n^{th}$ second in the observation window. If this difference is less than five, then the ranked process might not get the needed resources. If the average resources available either cannot serve the additional (i.e., more than average) demand, or after serving the demand with little overhead (e.g., if there is less than 5% of a buffer to handle rapid spikes in usage), then the resource may be deemed to be unavailable. Or in other words, the resource demand has not been met.

This algorithm generates two parameters: 1) a type of resource needed; and 2) the highest possible demand, to be used in safeguard activation. The highest possible demand is $U_n$, i.e., the usage at the $n^{th}$ second, when the $D^n$ is less than 5.

Figure 7:
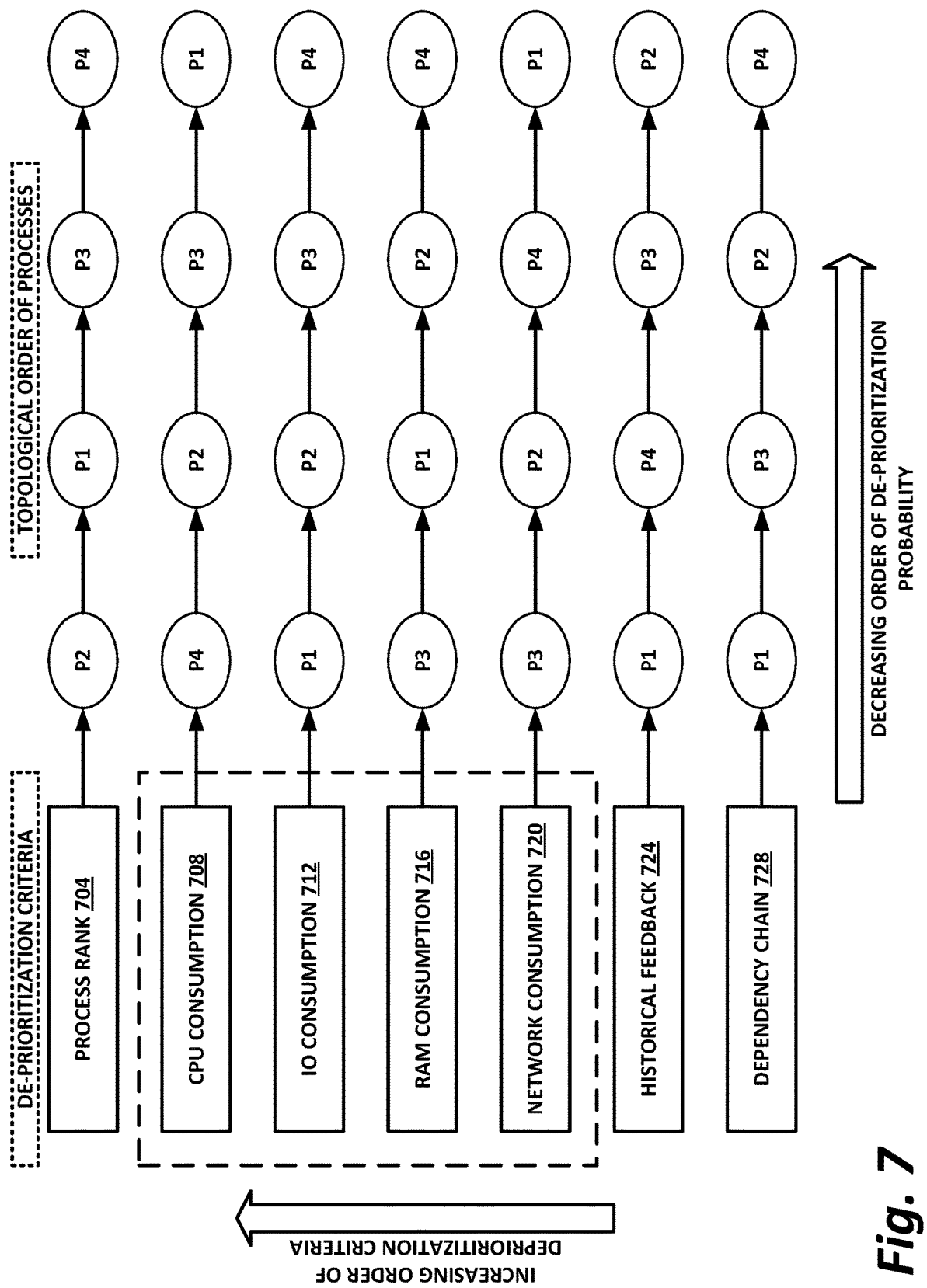
FIG. 7 is a block diagram illustration of a deprioritization hierarchy.

A safeguard activator, such as safeguard activator 228 of FIG. 2, may provide an algorithm to reallocate resources, as necessary. After identifying a potential resource starvation condition in a ranked critical process, a safeguard activator may remediate the problem. For example, currently prioritized processes (i.e., the top n processes ranked in the system, where n may be an integer value, for example, between 2 and 10) may be tracked in a resource-wise process prioritization topology (RWPPT) graph. Such a graph is illustrated in FIG. 7. The RWPPT graph is a customized graph that maintains and manages the relationships among the processes, their current priorities, and resource consumption for each resource.

In an embodiment, four parameters may be considered in building the RWPPT graph:
  1. The rank of the process computed by the process ranking engine.
  2. The amount of resources consumed by the process.
  3. A process dependency chain.
  4. Feedback. This may include a history of negative impact of the process's priority chains, coming from a knowledge base called, for example, safeguard rules (e.g., safeguard rules 236 of FIG. 2).

The RWPPT graph may exist in the form of an ordered adequacy list, as shown in FIG. 7. The processes are ordered in decreasing order of "selection probability for deprioritization," and the list headers are "deprioritization criteria," ordered from top to bottom in decreasing order of importance.

FIG. 7 is a block diagram illustration of a deprioritization hierarchy. In this illustration, a number of factors are listed according to their increasing order of deprioritization criteria. These are shown on the left, with increasing order going from bottom to top.

On the right, there are illustrated four different processes that are running on an example system. These processes are referred to as P1, P2, P3, and P4, respectively. For each deprioritization criterion, the processes are ranked from left to right in decreasing order of deprioritization probability.

For example, in this case, deprioritization criteria include process rank 704, CPU consumption 708, I/O consumption 712, random access memory (RAM) consumption 716, network consumption 720, historical feedback 724, and dependency chain 728. Because these deprioritization criteria increase from bottom to top, process rank 704 may be the most heavily weighted, while dependency chain 728 is the least weighted.

When a score is assigned to a process, it may be assigned a weight according to the priority of the criterion. This weight may be a fractional value between 0 and 1, with values closer to 1 representing greater weight, and values closer to 0 representing lesser weight.

Each of the four processes are individually ranked for each criterion. These are listed from left to right in decreasing order of deprioritization probability. For example, for process rank 704, process P2 is the most likely to be deprioritized, process P1 is the next most likely, process P3 is the next most likely, and process P4 is the least likely to be deprioritized. Similarly, for CPU consumption 708, process P4 is the most likely to be deprioritized, followed by processes P2, P3, and P1, respectively. For I/O consumption 712, process P1 is the most likely to be deprioritized, with processes P2, P3, and P4 following respectively.

For RAM consumption 716, process P3 is the most likely to be deprioritized, with processes P1, P2, and P4 following respectively. For network consumption 720, process P3 is the most likely to be deprioritized, with processes P2, P4, and P1 following respectively. For historical feedback 724, process P1 is the most likely to be deprioritized, with processes P4, P3, and P2 following respectively. For dependency chain 728, process P1 is the most likely to be deprioritized, with processes P3, P2, and P4 following respectively.

Taking this matrix as a whole, process P2 is heavily weighted toward being deprioritized, as it has the highest priority within process rank 704. On the other hand, process P4 has the lowest priority within dependency chain 728, and thus, may be less likely to be deprioritized than process P2. However, according to the algorithm disclosed herein, weights from all of these factors may be considered in the deprioritization.

The system may also account for an intensity of the safeguard. The amount of priority reduction may be proportional to the highest possible demand of the ranked process. For example, if the current availability of the CPU is 1%, and the starving process's highest possible demand is 4%, then the goal is to free 3% more, and to not perform unnecessarily aggressive deprioritization.

To keep deprioritization sensible, the reduction may be performed in the smallest unit of priority change. For example, if the priority spectrum is represented as High→Above Normal→Normal→Low, then the priority reduction happens from high to above normal, and does not go from normal to low, directly. For example:

$$(Rfree <= HPD) \rightarrow fpd(p \rightarrow p-1)$$

Rfree=Resource currently available
HPD=Highest possible demand
fpd=Function of priority downgrade to next smaller unit
p=Index of current priority of the process in the priority list of the resource
$1 <= p <=$ Number of priorities values possible for the given resource An example of this system has been observed experimentally. For example, a comparison was done in an experimental system running Blender and Discord, wherein the user was rendering video in Blender. The results without the process ranking engine included:

TABLE 1

User Experience Without System

| Application | Scenario | Application CPU Usage | System CPU Usage | Experience |
|---|---|---|---|---|
| Blender | User is rendering video | >97% | 100% | System hangs-up |
| Discord | Gamer in audio chat, and game is boosted | >97% (Game) | 100% | 20 seconds (Fragmented) chat could happen in a window of 5 minutes |

A user experience with the process ranking engine provided the following:

TABLE 2

User Experience with System

| Application | Scenario | Application CPU Usage | System CPU Usage | Experience |
|---|---|---|---|---|
| Blender | User is rendering video | >97% | 100% | No hang experienced |
| Discord | Gamer in audio chat, and game is boosted | >97% (Game) | 100% | More than 270 seconds of chatting happened successfully in window of 5 minutes |

Figure 8:
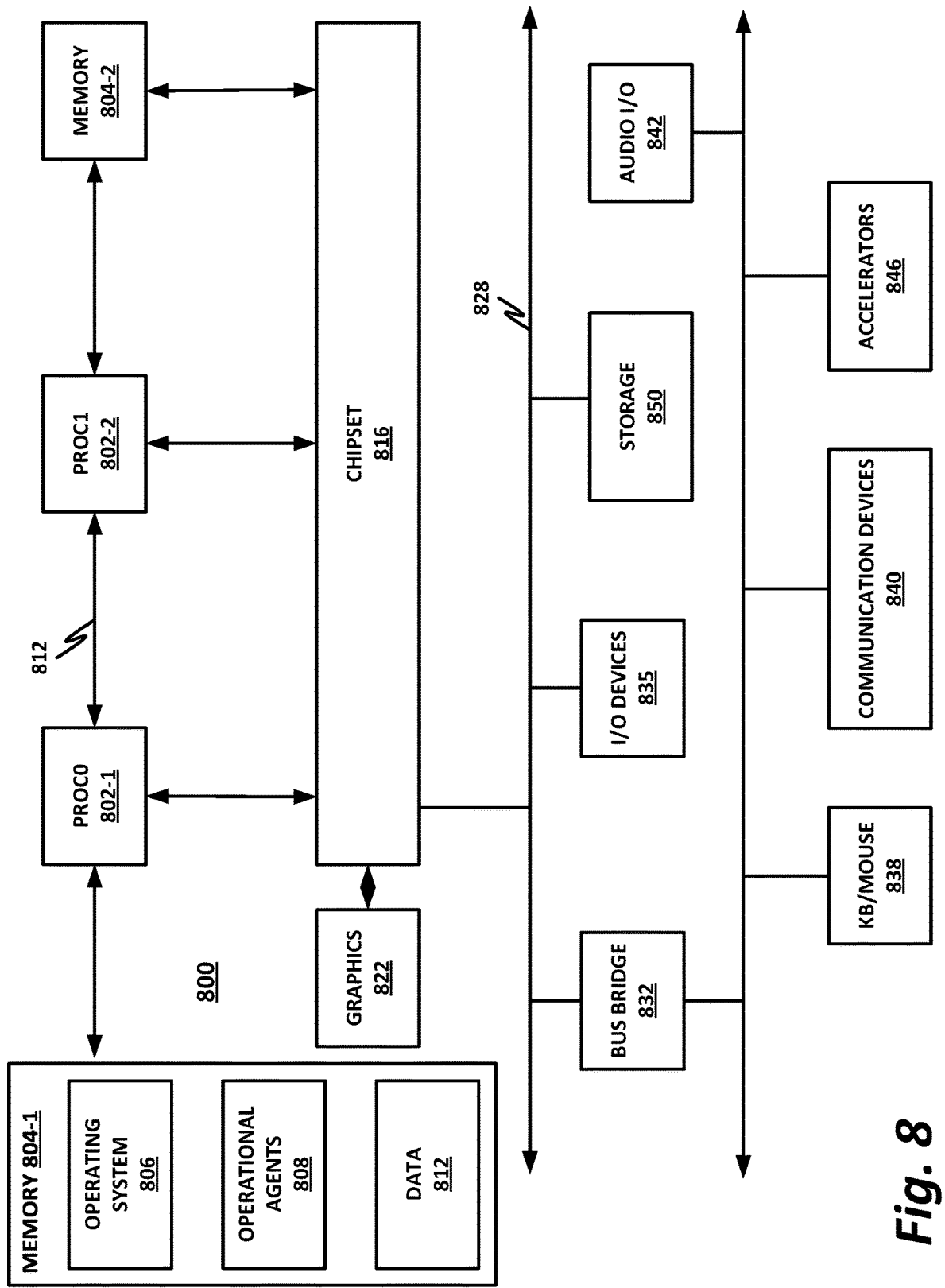
FIG. 8 is a block diagram of selected elements of a hardware platform.

FIG. 8 is a block diagram of a hardware platform 800. In at least some embodiments, hardware 800 may be configured or adapted to provide dynamic process criticality scoring, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
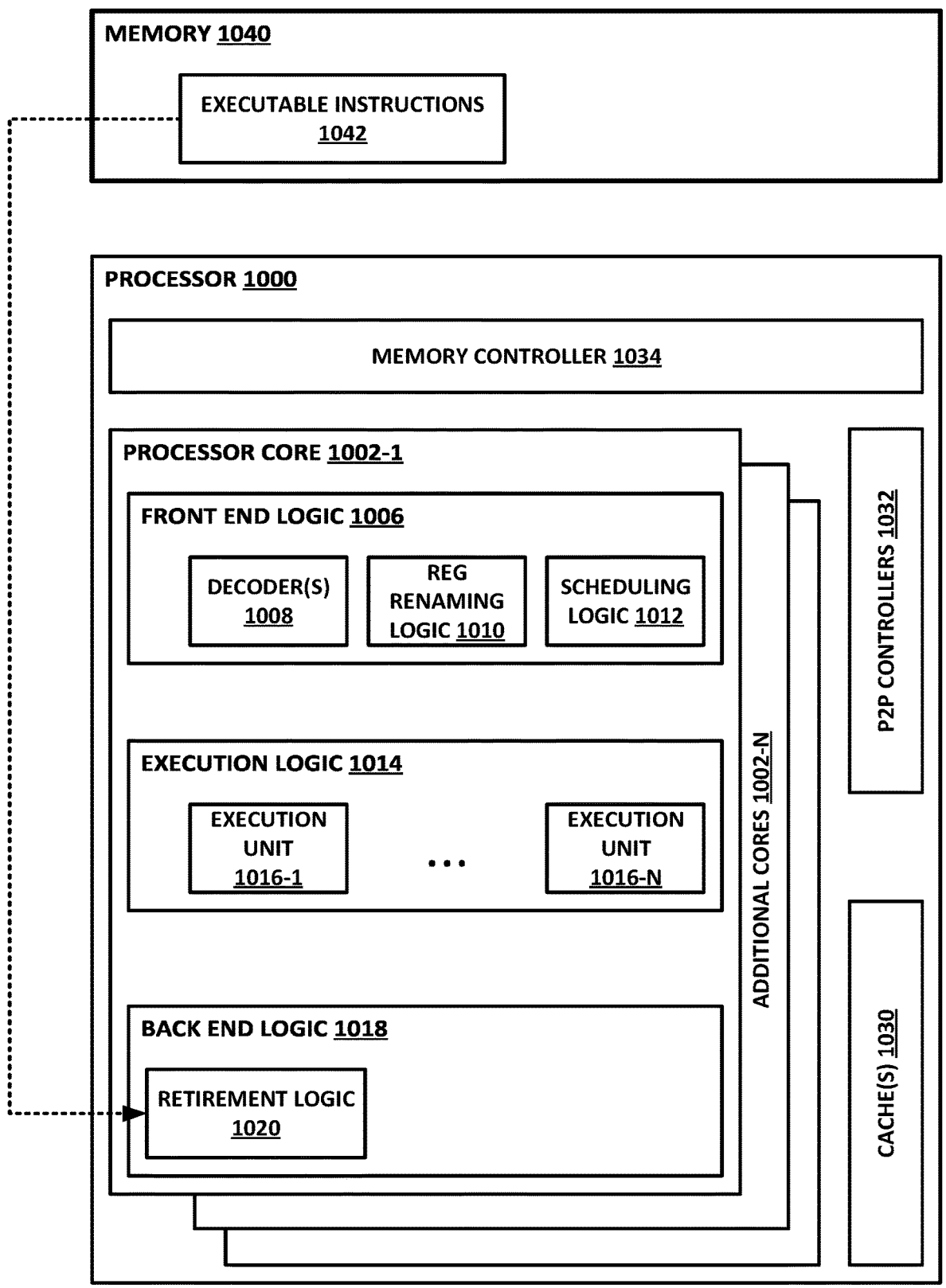
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, RAM, double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency non-volatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own GPU.

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
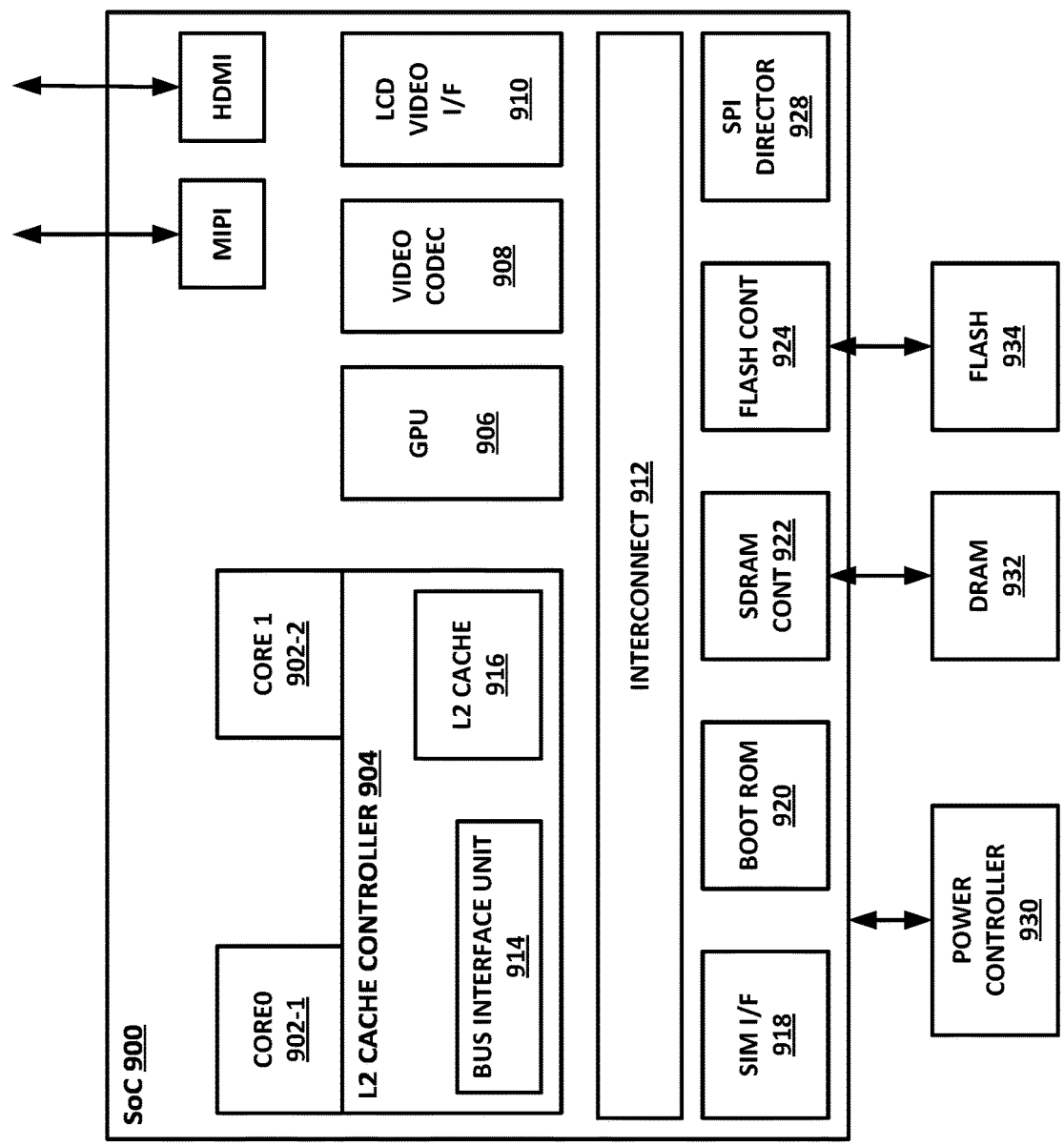
FIG. 9 is a block diagram of selected elements of a system-on-a-chip (SoC).

FIG. 9 is a block illustrating selected elements of an example SoC 900. In at least some embodiments, SoC 900 may be configured or adapted to provide dynamic process criticality scoring, according to the teachings of the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) director 928, a suitable power control 930, a dynamic RAM (DRAM) 932, and flash 934. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 900 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be configured or adapted to provide dynamic process criticality scoring, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via network function virtualization (NFV), and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e., asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
    an endpoint hardware platform comprising a central processor unit (CPU) circuit and a memory; and
    instructions encoded within the memory to instruct the CPU circuit to:
        enumerate a plurality of running user processes, and associate resource demands with the running user processes;
        predict a resource starvation condition for a selected user process, selected from the running user processes;
        rank the plurality of running user processes according to a multi-factor resource-wise process prioritization topology, wherein ranking comprises including device-local user interaction as an input for ranking the selected user process; and
        according to the ranking and a safeguard algorithm, deallocate resources from a process ranked lower than the selected user process and assign the deallocated resources to the selected user process to mitigate the predicted resource starvation condition.

2. The computing apparatus of claim 1, wherein the instructions are further to build a topologically-ordered process graph to use as an input to the multi-factor resource-wise process prioritization topology.

3. The computing apparatus of claim 2, wherein the topologically-ordered process graph comprises a two-dimensional matrix of process priority and resource priority.

4. The computing apparatus of claim 1, wherein user engagement is a function of user focus time.

5. The computing apparatus of claim 1, wherein user engagement is a function of user interactions with a user interface.

6. The computing apparatus of claim 1, wherein user engagement is a function of data streaming duration.

7. The computing apparatus of claim 1, wherein user engagement is a function of a usage mode.

8. The computing apparatus of claim 7, wherein the usage mode is selected from work, leisure, or kids.

9. The computing apparatus of claim 1, wherein the multi-factor resource-wise process prioritization topology includes a static user-assigned ranking as an input.

10. The computing apparatus of claim 1, wherein the multi-factor resource-wise process prioritization topology includes system criticality as an input.

11. The computing apparatus of claim 1, wherein at least some of the plurality of running user processes have a pre-assigned priority.

12. The computing apparatus of claim 1, wherein deallocating comprises deallocating resources from a process with a higher pre-assigned priority to a process with a lower pre-assigned priority or without a pre-assigned priority.

13. At least one tangible, non-transitory computer-readable storage medium having stored thereon executable instructions to:
    enumerate, on an endpoint device, a plurality of running user processes having user-assigned static rankings;
    identify a resource starvation condition for a selected process, selected from the running user processes;
    dynamically rank the plurality of running user processes via a multi-factor resource-wise process prioritization topology that includes a user engagement score, wherein the user engagement score accounts for device-local user interaction with running user processes; and
    apply a safeguard algorithm to shift resources to the selected process from a process ranked lower by the multi-factor resource-wise process prioritization topology.

14. The at least one tangible, non-transitory computer-readable storage medium of claim 13, wherein identifying the resource starvation condition comprises examining a process's resource utilization over a window, and resource availability over a window, and predicting a starvation condition if a difference between a maximum usage and a minimum availability within the window is less than a threshold.

15. The at least one tangible, non-transitory computer-readable storage medium of claim 13, wherein the plurality of running user processes have a pre-assigned rank selected from 0, 1, and 2.

16. The at least one tangible, non-transitory computer-readable storage medium of claim 13, wherein the safeguard algorithm uses a minimum of 20% availability for a resource for a process with a pre-assigned rank of 0.

17. The at least one tangible, non-transitory computer-readable storage medium of claim 13, wherein the safeguard algorithm uses a minimum of 15% availability for a resource for a process with a pre-assigned rank of 1.

18. The at least one tangible, non-transitory computer-readable storage medium of claim 13, wherein the safeguard algorithm uses a minimum of 5% availability for a resource for a process with a pre-assigned rank of 2.

19. A method of providing process management for an endpoint computing system, comprising:
    receiving static priority assignments for a plurality of n user processes of the endpoint, wherein n is an integer greater than 1;
    predicting that a selected process from among the plurality of user processes will encounter a resource shortage;
    dynamically ranking the plurality of user processes according to a multi-factor resource-wise process prioritization topology, wherein the multi-factor resource-wise process prioritization topology accounts for device-local user interaction with user processes;
    selecting a lower-ranked process according to the multi-factor resource-wise process prioritization topology; and
    shifting a resource allocation from the lower-ranked process to the selected process.

20. The method of claim 19, wherein $2 \leq n \leq 10$.

* * * * *